(No Model.) R. R. OSGOOD. 4 Sheets—Sheet 1.
DUMPING SCOW.
No. 330,043. Patented Nov. 10, 1885.
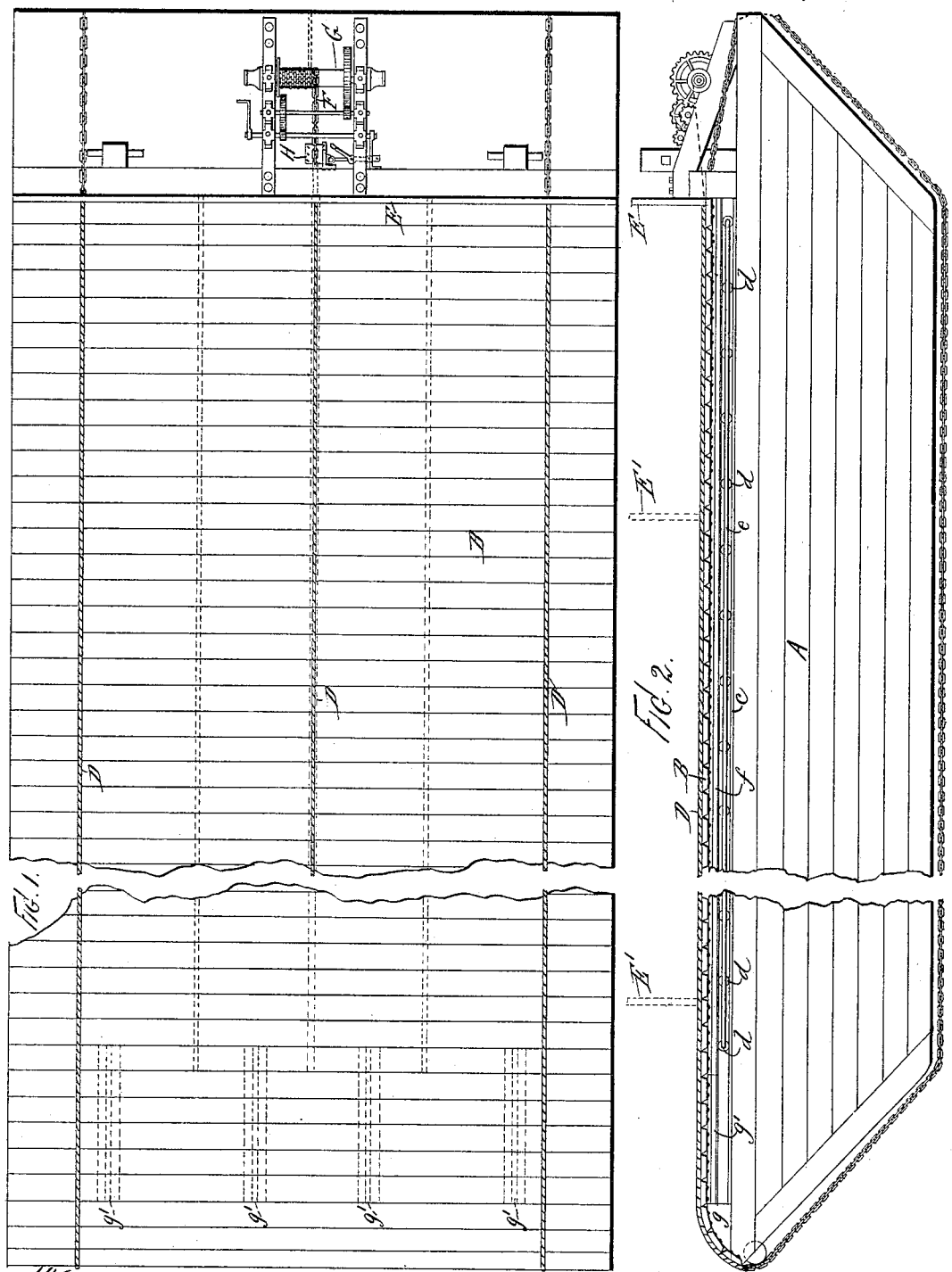

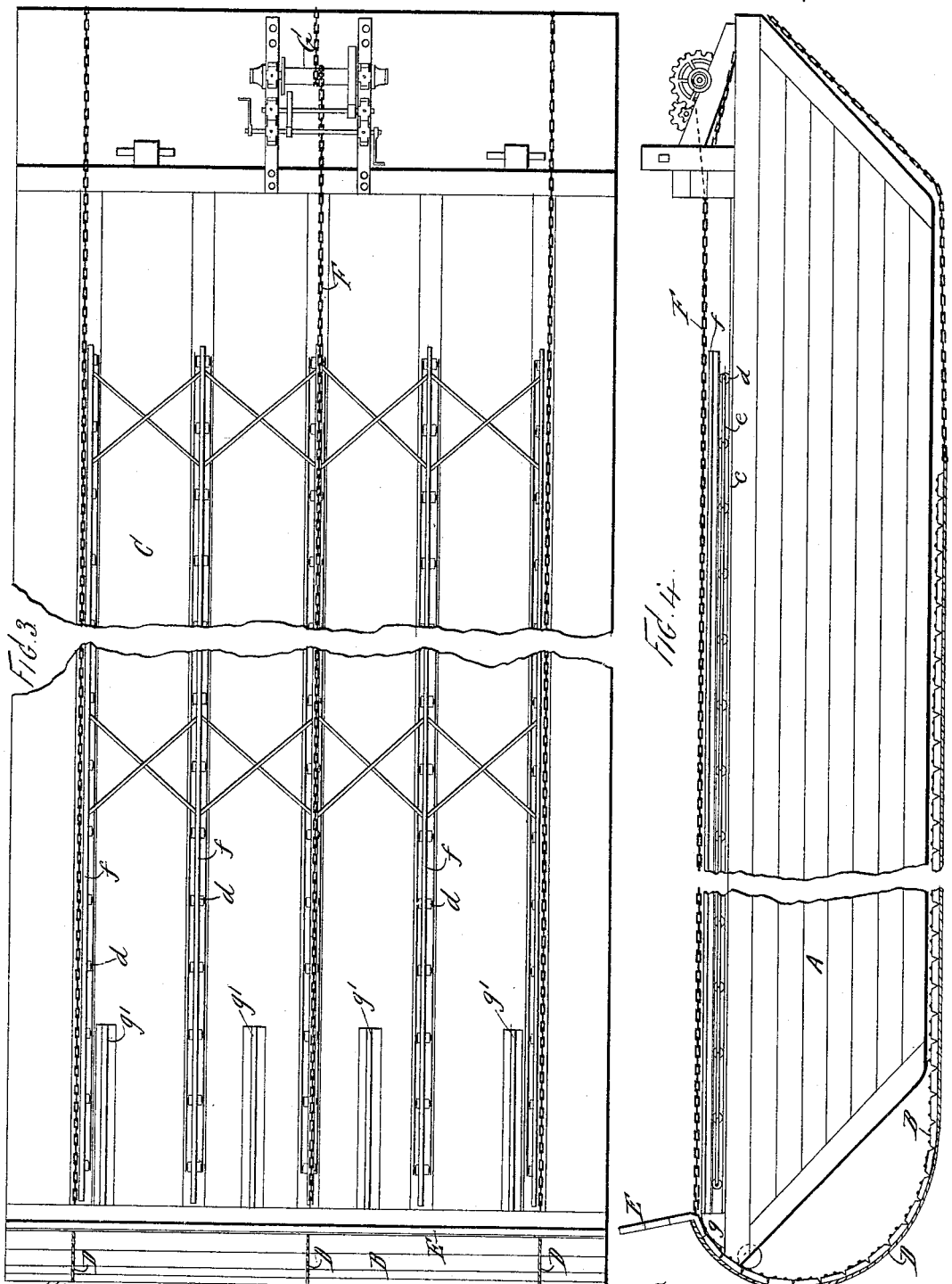

(No Model.)  4 Sheets—Sheet 3.

R. R. OSGOOD.
DUMPING SCOW.

No. 330,043. Patented Nov. 10, 1885.

Witnesses:
John Buckler
L. H. Osgood

Ralph R. Osgood,
Inventor:
By Worth Osgood,
Attorney.

(No Model.) 4 Sheets—Sheet 4.
R. R. OSGOOD.
DUMPING SCOW.
No. 330,043. Patented Nov. 10, 1885.
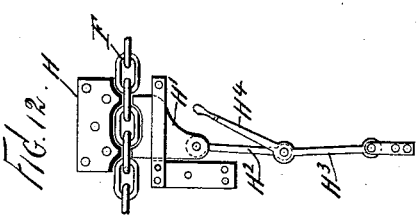
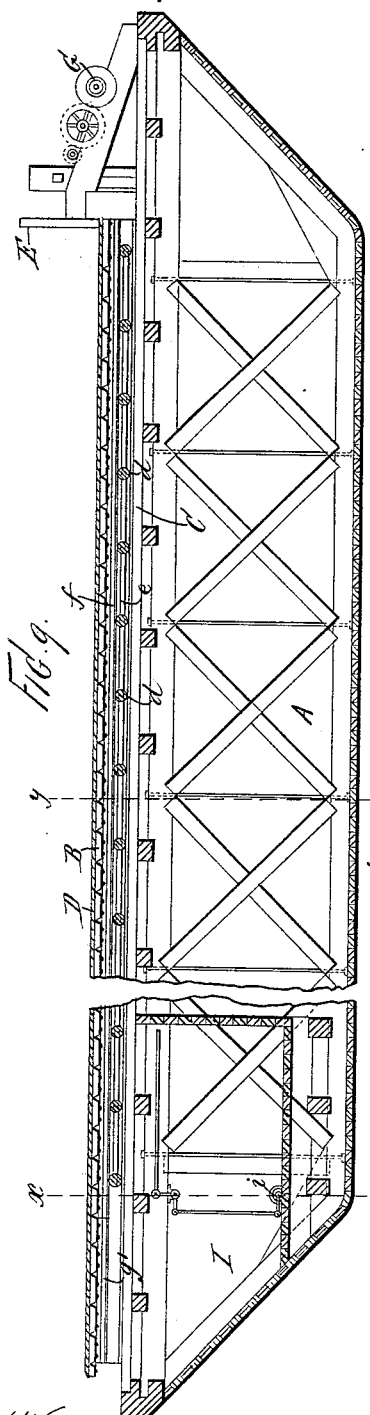
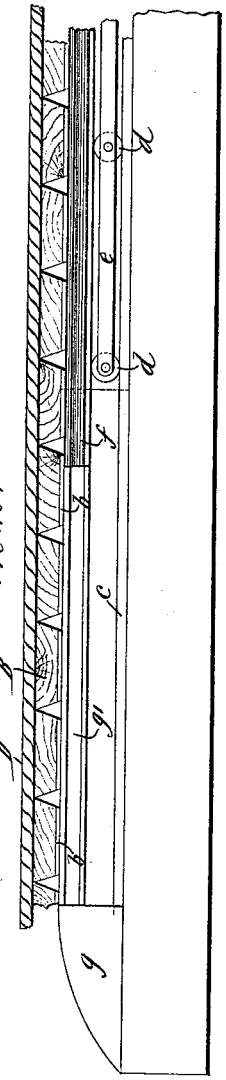
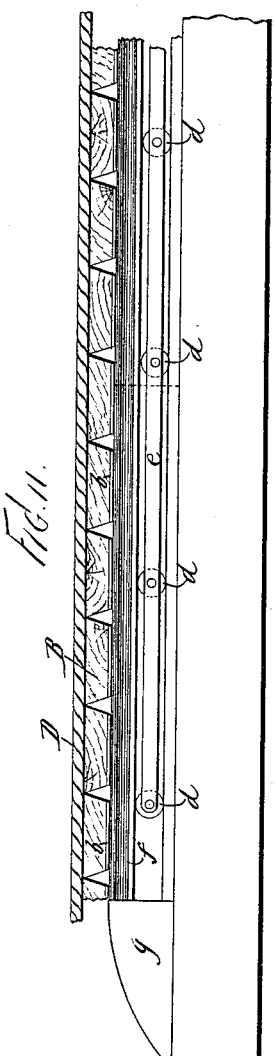
Witnesses:
John Buckler,
L. H. Osgood.
Ralph R. Osgood,
Inventor.
By Worth Osgood
Attorney.

UNITED STATES PATENT OFFICE.

RALPH R. OSGOOD, OF ALBANY, NEW YORK.

DUMPING-SCOW.

SPECIFICATION forming part of Letters Patent No. 330,043, dated November 10, 1885.

Application filed January 5, 1885. Serial No. 152,119. (No model.)

*To all whom it may concern:*

Be it known that I, RALPH R. OSGOOD, of Albany, county of Albany, and State of New York, have invented certain new and useful Improvements in Dumping-Scows, of which the following is a full, clear, and exact description, reference being had to the accompanying drawings, and to the letters of reference marked thereon.

My invention has relation to that class of vessels which are provided with mechanical means for dumping or discharging the load, and ordinarily known as "dumping-scows," in contradistinction to those which have no such appliances, from which the load is intended to be shoveled or otherwise removed, and which are commonly known as "scows."

The object of my invention is to provide the scow with a simple, efficient, and easily-operating appliance, by use of which the load may be easily discharged in water smooth or rough, shallow or deep, on, near to, or far from the shore or bank, and whether the load be of materials of low specific gravity, or heavy, or mixed. To accomplish this object, my improvements involve certain novel and useful relative arrangements or combinations of parts, peculiarities of construction, and principles of operation, all of which will be herein first fully explained, and then pointed out in the claims.

Figure 5:
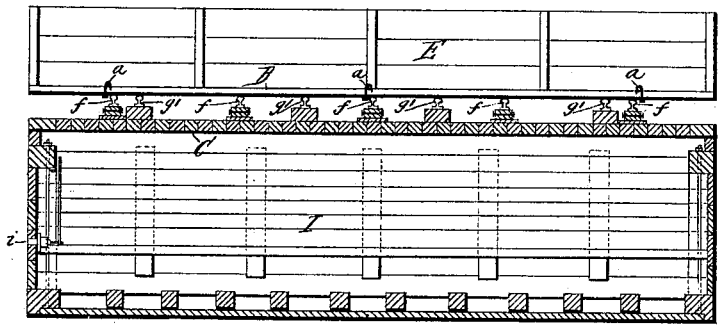
Figure 6:
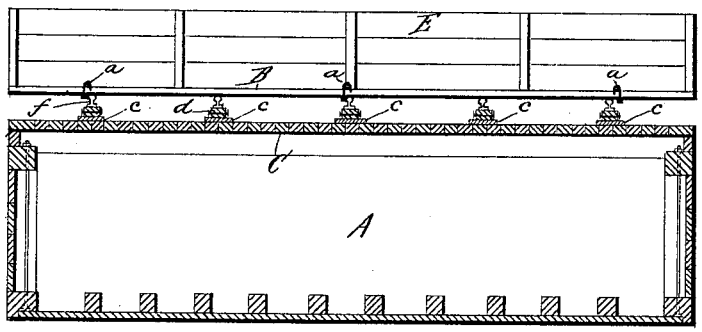
Figure 7:
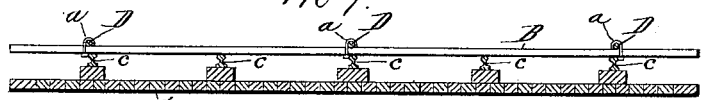
Figure 8:
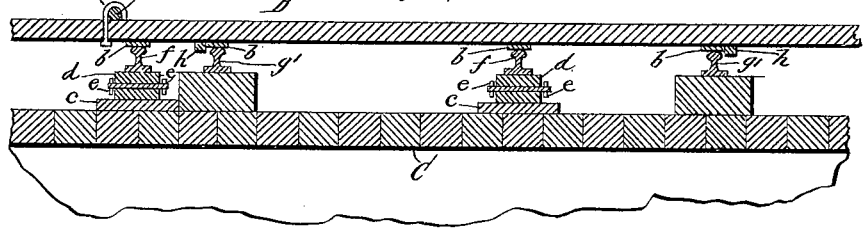

In the accompanying drawings, forming part of this specification, Figure 1 is a top or plan view, and Fig. 2 a side elevation, of a dumping-scow constructed and arranged for operation in accordance with my invention and involving the principles thereof, the apron or platform being shown in position to receive the load; and Figs. 3 and 4 are similar views showing the platform moved from over the top or deck of the scow, portions of these figures being broken away, indicating that the scow may be of any length. Fig. 5 is a cross-section and partial elevation upon a plane passing through line *x x* of Fig. 9. Fig. 6 is a similar view upon a plane passing through line *y y* of Fig. 9. Fig. 7 is a cross-section and partial elevation similar to Fig. 6, omitting the body of the scow below the deck and the head-piece connected with the platform, and showing the platform arranged to slide on ways without the intervention of friction-rollers, as in previous figures. Fig. 8 is a sectional view of a fragment of the deck and the movable platform, arranged the same as in Fig. 5, but upon a scale considerably larger than Fig. 5, so as to better show the working parts. Fig. 9 is a longitudinal section and partial elevation of my improved scow, showing the water tank or compartment therein, and omitting the portion of chain shown beneath the boat in Figs. 2 and 4. Fig. 10 is a side elevation of a fragment of the upper part of the boat and the appliances thereon, as in Fig. 9, but upon a scale enlarged beyond Fig. 9, so as to better show the arrangement of parts, the parts being in the position which they occupy when the platform is up or ready to receive its load; and Fig. 11 is a view similar to Fig. 10, showing the rollers and movable track in position which they occupy after the platform has started to move. Fig. 12 is a detailed view (in plan) of one form of appliance which may be conveniently used for holding and releasing the chain which controls or permits the movements of the movable platform.

In all these figures like letters of reference wherever they occur indicate corresponding parts.

Heretofore much difficulty has been found in dumping garbage or city refuse by mechanical dumping-scows, owing to the lightness of such material, its weight being insufficient to cause it to sink in the water away from the position of the scow. Dumping-scows that are provided with wells having downwardly-openings doors or lids at the bottom, and other arrangements for affording a vertical central discharge, are of necessity only capable of being operated in water sufficiently deep to accommodate the mass of the load beneath the boat and afford swinging room for the doors and other appliances, and they are not therefore capable of discharging their load upon the margin or bank, as is often desirable for purposes of "filling in" or "making land."

According to my invention I provide the scow A, which may be of any form or size, with a movable deck or platform, B, upon which the load may be placed. The stationary deck of the scow (represented at C) may be flat, and is preferably made water-tight, so that the vessel may easily ride in rough water without danger of sinking. The platform B is composed of a number of pieces or planks of sufficient length, united by any number of cables, D, or equivalent flexible chains, the said cables or chains being connected with the pieces by suitable hooks or staples or other fastenings, as $a$, and the pieces being slightly undercut, as best represented in Figs. 10 and 11, so that the platform may bend, as when passing around one end of the scow, as indicated in Fig. 4. Each of the planks of the movable platform may be provided with metallic wearing pieces or shoes $b$, to prevent undue wear from the movements of the platform. Upon the scow-deck C are secured a sufficient number of rails $c$. As shown in Figs. 5 and 6, these are flat and intended for ways upon which friction-rollers may travel; but they may be in the form of railroad-iron, as shown in Fig. 7, and the platform made to bear thereon directly or without the intervention of friction-rollers.

Under some circumstances it is desirable to employ rollers, so that the platform with its load may be started by the application of less power than would otherwise be required, and for this purpose I provide a number of rollers, $d$, axled between side pieces, $e$, and arranged to travel back and forth upon the ways $c$. Between the rollers and the movable platform are rails $f$. When the platform starts to move, the rails $f$ travel with it, moving upon the rollers with little friction, and travel along until they are arrested by a hurter, $g$, or other substantial obstruction placed in their path and secured to the scow.

The momentum of the platform and its load at the instant when the rails strike causes the load and platform to continue their travel, the platform sliding on the rails in a manner which will be readily understood. When the platform is drawn back to its original position, the rails $f$ and rollers $d$ travel back with it and assume a position ready for the next dumping movement.

Near the end of the scow are short stationary tracks or ways $g'$, which support the end of the platform when the rails $f$ are drawn back. The platform is prevented from shifting sidewise on its supports by any simple form of retaining device, as $h$ $h$, which may abut against the stationary rails $g'$ $g'$.

E is a head-piece erected upon the platform and intended to sustain the forward end of the load. Any number of similar pieces, as indicated by dotted lines E' E', may be applied at intervals upon the platform, and the operation of these pieces or partitions is to afford brakes to prevent the platform from sliding too rapidly, the brakes affording a large surface to resist the travel of the platform through the water beneath the scow.

A chain or cable, F, amply strong for the purposes intended, is connected with the forward end of the traveling platform and passed over a suitable drum, G, which may be worked by hand or otherwise. When the platform is intended simply to float off the rear end of the scow, the chain F is unwound from the drum as the platform travels back, and by winding up the chain on the drum the platform is drawn up again to its original position.

When desired, the platform may be forced to take a position beneath the scow, as indicated in Fig. 4, in which case one end of the chain F is connected with the forward part of the platform and the other end with the rear part, the chain being made to pass around the drum so that it can be moved in either direction. Under this arrangement the platform may be started by turning the drum and drawn back to place after unloading, the same as before. When the platform is up, it is necessary to hold it from accidental slipping, and for this purpose I employ any suitable form of catch or lock.

In Fig. 12 I have shown a convenient form of catch, upon which I make no particular claim. In this form the chain F is made to pass between two blocks, one, H, made immovable, and the other, H', movable between suitable guides. The two levers $H^2$ $H^3$ are jointed together in such manner as to firmly hold the block H' when in set position and permit of the easy movement of the block H' by pulling upon the handle $H^4$, which is connected with $H^3$. By this contrivance the chain F and the platform connected with it may be held immovable or be instantly and easily released.

When traveling in rough water, the chain may be released, when the forward end of the scow is elevated, and the inclination which the load then assumes will generally be sufficient to cause the starting of the platform and load.

It will also be understood that the scow may be loaded heaviest at the stern, thus giving all the desired inclination to facilitate the starting; but when this loading and roughness of water cannot be depended upon, I provide a water-compartment, I, in the stern of the scow, the bottom of which compartment is located a trifle above the water-line of the unloaded scow. At or near the bottom of the tank or compartment is a valve, $i$, provided with suitable connections reaching to any convenient point in the vessel, the valve governing a port communicating with the exterior.

When the vessel is loaded, and it is desired to sink the stern in order to elevate the bow, the valve $i$ is opened, and sufficient water for the purpose allowed to enter the tank. After the unloading has been accomplished, the stern of the vessel will rise somewhat in the water and the water flow out of the tank. Then by closing valve $i$ water may be excluded from the tank and the scow loaded as before.

It will readily appear that the improved scow may be dumped in very shallow water, leaving the load always behind the scow, and it is immaterial whether the load be of light stuff, which will float, or whether it be heavy. Under favorable circumstances the load may be discharged and deposited at the margin of the water, as is often desirable when filling in or making land.

When constructed and arranged for operation in accordance with the foregoing explanations, the improved scow will be found to admirably answer the purpose or object of the invention as previously set forth.

Having now fully described my invention, what I claim as new, and desire to secure by Letters Patent, is—

1. In a dumping-scow, the movable platform composed of a series of strips or planks connected one with the other, said platform being arranged to move over the deck of the scow and to discharge the load over the stern thereof, the platform being combined with the boat or scow, substantially as and for the purposes set forth.

2. In combination with the movable platform mounted upon the boat, and composed of a series of strips or planks connected one with the other, the chain or cable attached to said platform and arranged to hold the same in position or permit or compel it to move, substantially as and for the purposes set forth.

3. The combination of the boat, the movable platform composed of a series of strips connected one with the other and mounted upon the boat, the chain or cable connected with said platform for controlling the movements thereof, and the chain-drum for operating the chain, said drum being mounted upon the boat, substantially as and for the purposes set forth.

4. The combination, with the movable platform composed of a series of strips connected one with the other and mounted upon the boat, of a chain or cable connected with the platform at both ends thereof and arranged to draw the platform off from over the deck or back to its position on the deck, substantially as shown and described.

5. The combination of the boat, the movable platform composed of a series of strips connected together and mounted upon the boat, and the rollers arranged between the boat and the movable platform, for supporting said platform and permitting its easy movement back and forth, substantially as and for the purposes set forth.

6. The combination of the boat, the movable platform composed of a series of strips connected together and mounted upon the boat, the friction-rollers made movable over the deck, and the movable tracks mounted upon said rollers and between them and the platform, substantially as and for the purposes set forth.

7. In a dumping-scow having a movable platform composed of a series of strips connected together and mounted and made movable on and over the deck, the combination, with the scow or boat, of the water-tank located within the stern, the parts being arranged, as explained, so that when the tank is filled the stern will sink, and thus facilitate the movements of the platform and its load, substantially as and for the purposes set forth.

8. In a dumping-scow, the combination, with the movable platform composed of a series of connected strips or planks and arranged to be moved back and forth over the deck, of the head-piece erected upon the forward end of said platform, projecting above the surface thereof, connected therewith, and arranged to keep the forward part of the load in place, substantially as and for the purposes set forth.

9. In a dumping-scow, the combination, with the movable platform mounted thereon and arranged to move above and beneath the boat, as explained, of one or more partitions erected upon said platform, connected therewith, projecting beyond the surface thereof, and arranged to operate as brakes for the purpose of preventing the platform from moving too rapidly through the water, as shown and described.

10. The herein-described dumping-scow, composed of the boat having a water-compartment in the stern, rails or ways secured to the deck, the friction-rollers movable upon said rails or ways, the sliding tracks resting upon the rollers, the movable platform composed of a series of connected strips or planks, a chain or cable attached to the movable platform, and the chain-drum upon which said chain is wound, said drum being mounted upon the boat, these parts being combined and arranged substantially as and for the purposes set forth.

In testimony that I claim the foregoing I have hereunto set my hand in the presence of two witnesses.

RALPH R. OSGOOD.

Witnesses:
 JOHN BUCKLER,
 WORTH OSGOOD.